3,065,245
CONTINUOUS EPOXIDATION METHOD
Harold K. Latourette, Pennington, and Harry M. Castrantas, Trenton, N.J., assignors to FMC Corporation, a corporation of Delaware
Filed Oct. 5, 1959, Ser. No. 844,245
8 Claims. (Cl. 260—348.5)

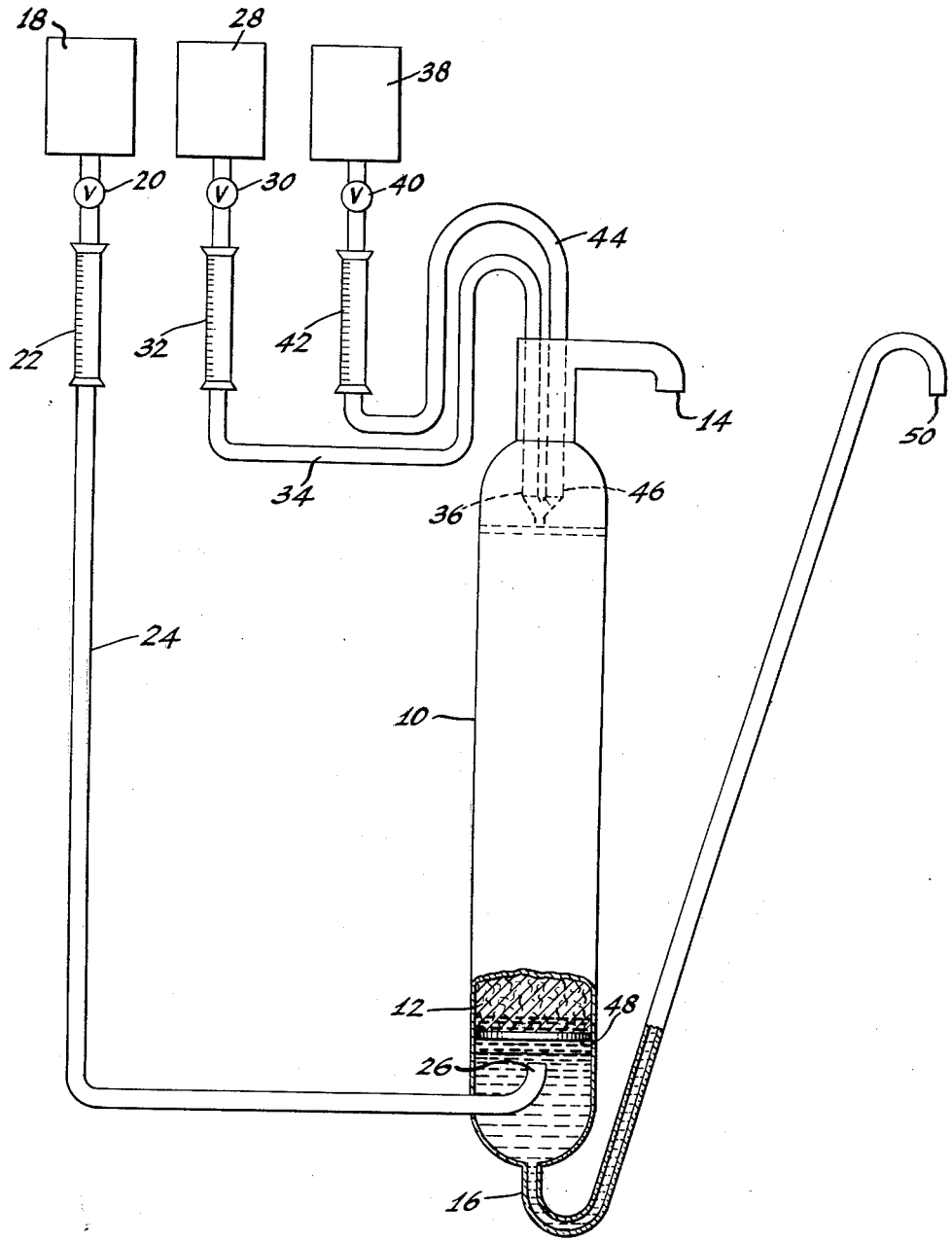

This invention relates to a method of epoxidizing ethylenic compounds by reacting them with carboxylic peracids formed in situ in the reaction mixture, and particularly to such a method in which the reaction is conducted continuously in a countercurrent column.

Epoxidized unsaturated fatty esters and other olefinic compounds are employed commercially in such applications as plasticizers and stabilizers for polymers, acid scavengers, and the like. These epoxidized compounds are produced by reacting olefinic bonds in the ethylenic compounds with an aliphatic carboxylic peracid, for example with peracetic acid or performic acid. This results in the addition of one oxygen atom to the ethylenic compound at the site of each olefin bond which is reacted, forming an oxirane (epoxy) group. This reaction is illustrated by the following equation:

Heretofore, the epoxidation of ethylenic compounds has been carried out in batch operations in which the reaction is either carried out completely in one reaction vessel, or in which the ethylenic compound is progressively epoxidized in a series of vessels. It has been preferred to form the peracid in situ in the solution of ethylenic compound to be epoxidized. This is accomplished by adding aqueous hydrogen peroxide to a solution containing the ethylenic compound and an aliphatic carboxylic acid, while maintaining the solution under a high degree of agitation. The hydrogen peroxide reacts with the aliphatic carboxylic acid as follows:

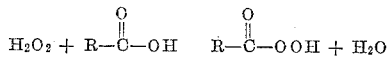

An acid catalyst, suitably sulfuric acid, is normally added to the solution to catalyze production of the peracid. Greenspan and Gall, in U.S. Patent 2,801,253, teach a typical in situ batch epoxidation employing acetic acid as their aliphatic carboxylic acid.

The batch process has been used to prepare epoxidized products in large tonnages. However, it suffers the major drawback that the reaction is slow. The long reaction time required is likely due to the characteristically small concentrations of both the ethylenic compound and the peracid during a large part of the reaction, and the consequently unfavorable application of the law of mass action. The slowness of the reaction, coupled with the high labor and equipment costs of the batch process, has caused many workers to attempt to improve on it. An operation which could be conducted on a continuous basis, and in shorter time, has been particularly desired.

It is an object of this invention to provide a continuous epoxidation method.

It is a further object of this invention to provide such a process in accordance with which large amounts of ethylenic compound can be epoxidized efficiently and in a short time.

It has now been found that ethylenic compounds can be epoxidized continuously, by countercurrently contacting them with epoxidizing reagents in an elongated reaction zone, provided that means are present to disperse the gas formed by the decomposition of hydrogen peroxide during the course of the reaction. This method of carrying out the epoxidation reaction provides good yields of epoxy product, and, importantly, does so with a surprisingly short time of contact between a given amount of ethylenic compound and epoxidizing reagent.

These ends are accomplished in accordance with the present method by introducing an ethylenic compound into one end of an elongated reaction zone, introducing an aqueous phase comprising hydrogen peroxide and an aliphatic carboxylic acid having from 1 to 8 carbon atoms into the other end of the reaction zone, passing the ethylenic compound continuously and countercurrently with said aqueous phase, and in intimate contact therewith, and dispersing gases present in the reaction zone. The epoxidized product of this operation is withdrawn from the reaction zone at the end opposite to the entry point for the ethylenic compound, an aqueous phase is withdrawn from the other end.

The ethylenic compound to be epoxidized is introduced into one end of the reaction zone, and hydrogen peroxide and an aliphatic carboxylic acid having from 1 to 8 carbon atoms is introduced into the opposite end of the reaction zone. The hydrogen peroxide and carboxylic acid react in situ to form the corresponding lower aliphatic peracid, and the peracid, or aqueous phase and the ethylenic compound are passed countercurrently and continuously through the reaction zone. The epoxidized product is removed from that end of the zone opposite which it is introduced, and an aqueous phase, containing carboxylic acid, any remaining peracid, and other water soluble ingredients, is removed from the opposite end of the reaction zone.

The rate of epoxidation throughout this reaction is much more uniform and rapid than that encountered with similar batch processes, since the concentration of at least one of the reactants, the peracid or the olefinic compound, is always high throughout the reaction zone. In contrast to this, single or series batch processes have very small concentrations of both peracid and unreacted ethylenic feed components present during a large part of the reaction. Since the reaction rate varies with the concentration of both feed components, the instant process requires shorter reaction times than the batch type processes.

The hydrogen peroxide is employed in the amount of about 1 mole per mole of ethylenic unsaturation to be epoxidized, whereas the lower aliphatic acid is employed in the amount about 0.25 to 1 mole per mole of ethylenic unsaturation to be epoxidized. Where desired or necessary, a strong acid such as sulfuric acid, phosphoric acid, toluene sulfonic acid, nitric acid, a cation exchange resin or the like may be added with the aliphatic carboxylic acid to catalyze the peracid formation reaction.

This process has been found suited to the epoxidation of a variety of compounds containing ethylenic unsaturation. These compounds may be acids, esters, alcohols, or other compounds containing an unsaturated aliphatic group which may be readily epoxidized as taught by Swern in "Chemical Reviews" (1949), vol. 45, pg. 1–68. However, it is well known in the art as taught by Swern, that compounds having substituted electron attracting groups, such as halogens, ether, carbonyl, nitro, ketone, aldehyde, cyanide, or ester groups, and the like, in a position alpha to the ethylenic bond, are not easily epoxidized with aliphatic peracids. The ethylenic compounds selected for epoxidation however must not otherwise react with the added peroxide, or aliphatic carboxylic acid, except in the epoxidation reaction. More specifically, compounds such as methyl oleate, cotton seed oil, oleyl oleate, soybean oil, olive oil, butyl oleate, the methyl ester of soya fatty acids, the butyl ester of soya fatty acids, the methyl ester of cotton seed fatty acids, the butyl ester of cotton seed fatty acids, oleic acid, oleyl alcohol, dodecene, and butadiene polymers and copolymers, may be epoxidized by the herein method.

The peracids which may be employed in this process are those derived from aliphatic carboxylic acids having from 1 to 8 carbon atoms. The preferred range of aliphatic carboxylic acids are those containing 1 to 3 carbon atoms. The carboxylic acids employed may be monobasic or dibasic acids, and may have reactive groups substituted thereon such as halogen, or hydroxyl moieties. Examples of such substituted aliphatic carboxylic acids are monochloroacetic, pyruvic, and oxalic acid.

The acid catalyst, which is added with the aliphatic carboxylic acid, may be any strong mineral or organic acid, such as those conventionally employed in the epoxidation art. The preferred mineral acids are sulfuric and phosphoric acids. Strong organic acids which have been found suitable are trihaloacetic acids such as trichloroacetic acid, methane sulfonic acid, and toluene sulfonic acid.

The present reaction can be conducted between about 30° and about 100° C. While the reaction may be run at less than 30° C., the reaction at such low temperatures is slow for normal use, and it is preferred to operate at temperatures above this point. The preferred range of operation is generally between 50° and 90° C., depending upon the particular ethylenic compound to be epoxidized. An optimum range of 60° to 70° C. has been found ideal for most of the common ethylenic feeds employed. It is important that the reaction be run at temperatures no higher than about 100° C., in order to avoid undue ring opening. This necessitates careful temperature control in the epoxidation column, because the epoxidation reaction is a vigorously exothermic reaction, releasing about 59.8 kilocalories per gram mole of ethylenic unsaturation being reacted. Suitable means for dissipating this heat throughout the system is therefore desirable. The reaction in the column is run at atmospheric pressure, although superatmospheric pressure may be employed, if desired.

The hydrogen peroxide, which is added at the top of the column, is normally added in the amount of about 1.0 to about 1.2 moles per mole of ethylenic unsaturation to be epoxidized. If smaller quantities of hydrogen peroxide are employed, incomplete epoxidation results. Higher quantities of hydrogen peroxide, that is above 1.2 moles per mole of ethylenic unsaturation, may be employed if desired, but economic consideration generally dictate utilizing minimum amounts of such peroxide.

The concentration of the aqueous hydrogen peroxide solution employed may range from about 27 weight percent to about 98 weight percent of peroxide. The lowest concentration of hydrogen peroxide which may be used is governed by the reaction rate of the more dilute solutions in forming the peracid. Aqueous solutions of hydrogen peroxide below 27 weight percent provide low reaction rates, and for this reason this normally will not be used. However, in cases where a low rate of reaction can be tolerated, they may be used. The preferred concentration of aqueous hydrogen peroxide ranges from 45 to 55% by weight. When employing concentrations of hydrogen peroxide above about 50%, special precautions must be observed to prevent explosions, since such mixtures may enter the range of explosive compositions for this system.

The aliphatic carboxylic acid normally is employed in as concentrated form as is practically possible. In the case of acetic acid, for example, glacial acetic acid is used. The amount of lower aliphatic acid added is between 0.25 to 1 mole per mole of ethylenic unsaturation desired to be epoxidized, depending upon the particular olefinic feed employed. The amount of carboxylic acid employed directly effects the amount of ring opening obtained, and using more than 1 mole of carboxylic acid per mole of olefinic unsaturation desired to be epoxidized, results in excessive ring opening. Lower amounts of carboxylic acid than 0.25 mole per mole of ethylenic unsaturation may be employed, but are not advantageous, since the reaction rate is reduced.

A strong acid catalyst, e.g. sulfuric or phosphoric acid may be added to catalyze the formation of peracid. The amount of acid catalyst added varies with the particular carboxylic acid employed. For example, when formic acid is used as the carboxylic acid, either 96% sulfuric acid in amounts from 0 to 5% by weight, or 85% phosphoric acid in amounts from 0 to 50% by weight, may be added to the column. Similarly, if acetic acid is utilized as the carboxylic acid, 96% sulfuric acid in amounts from 0.5 to 5% by weight, or 85% phosphoric acid in amounts from 1 to 50% by weight are suitable. The percent acid added is based on the total weight of both hydrogen peroxide and carboxylic acid added to the reaction zone. It is preferred to mix the acid and hydrogen peroxide ingredients before their introduction into the reaction zone.

The rate of flow of the ethylenic material through the column depends upon the physical dimensions and volume of the column. It has been determined that the residence time of the ethylenic material in the column should be from about 0.9 hour to 5.4 hours to secure optimum results. While longer hold up times may be employed, they result in proportionally greater amounts of ring opening and are not desirable. The dimensions and length of the column, and the packing therein, should be chosen so that sufficient contact time between the two phases takes place within the preferred residence times of 0.9 to 5.4 hours. A one inch column, filled with a packing of 6 mm. Berl saddles, and having a length of from 12 to 27 feet has been found to give sufficient contact between the two phases. Shorter columns will also operate, however the amount of epoxidation obtained in them will be diminished.

It is important that the ethylenic compound be in intimate, dispersed, contact with the aqueous phase during the reaction, in order that the advantages of the present invention will be realized. However, it has been found that when it is attempted to obtain intimate contact between the countercurrently flowing liquid phases, for example by using certain types of packing in the reaction zone, bubbles or gas pockets frequently are formed. The gases primarily result from hydrogen peroxide decomposition. When these gas pockets are permitted to remain undispersed in the reaction zone, the yield of epoxy product is reduced to a surprisingly high degree; in aggravated cases, essentially no epoxy product is recovered. Use of inert packings having their longest cross-sectional dimension no smaller than about 4 mm., results in both intimately contacting the liquid phases, and dispersing gas phases. Such packings include Berl saddles, Raschig rings, and the like. Likewise, a reaction column employing rotating discs, such as are described in Chem. Eng. Prog., March 1955, vol. 51, p. 141, operates with intimate dispersion and mixing of the countercurrently flowing phases, and the accumulation of gas pockets in such a column is at a minimum. Other means for dispersing bubbles or gas pockets, which may form, may be employed.

It has been determined that non-reactive immiscible solvents, particularly hydrocarbons, may be employed in the system to reduce viscosity, and to adjust other physical properties of the system which facilitate mass contact in the reaction zone. A solvent such as n-heptane has been found helpful in epoxidizing certain viscous feeds such as soybean oil, when added in amounts of about 25% by weight of the ethylenic feed. The solvent also acts to make it easier to maintain a constant temperature of reaction. Additionally, other additives such as surfactants may be added to either the oil or water phase in amounts of about .2% by weight of the phase to which it is added. Surfactants such as alkyl aryl polyether alcohols and alkyl aryl sulfonates have been added to the oil and water phases, respectively, to increase interfacial area.

The invention will now be described further with reference to the attached drawing. It is apparent that the scope of the invention is not limited to the embodiment shown therein.

In the drawing, 10 represents a reaction column having an upper outlet pipe 14 and a lower outlet pipe 16 connected to an elongated line which discharges at 50. The column 10 has a perforated plate 48 upon which the packing 12 is supported within the column. The packing 12 consists of inert particles whose largest cross-sectional dimension is no smaller than about 4 mm. A container 18 holds one of the reactants which flows through a valve 20 and rotameter 22, into entrance line 24 and into the base of the column at 26. A second container 28 holds a second reactant which flows into valve 30, through rotameter 32, into line 34 and enters the top of the column at 36. A third container 38 holds a third reactant which flows through valve 40, into rotameter 42, into line 44, and enters the top of the column at 46. Conventional heating and cooling means, not shown, are employed to maintain the desired reaction temperature.

The process operates in the column shown in the drawing as follows:

The ethylenic compound feed flows from container 18, through valve 20, and into rotameter 22, where its rate of flow is measured. The metered ethylenic material then flows into line 24 and is introduced into the base of the column through opening 26. Upon entering the base of the column, the ethylenic feed passes upward through an aqueous layer maintained in the base of the column, which contains the aliphatic carboxylic acid employed, and is thereby purged of water soluble impurities.

Simultaneously, aqueous hydrogen peroxide and the aliphatic carboxylic acid are introduced into the column as follows: aqueous hydrogen peroxide, preferably 50% by weight hydrogen peroxide, present in container 38 flows through valve 40 and into rotameter 42, where its rate of flow is measured. The metered hydrogen peroxide solution then flows into line 44 and is introduced into the top of the column through opening 46. The aliphatic carboxylic acid, mixed with a small amount of mineral acid as catalyst, flows from container 28, through valve 30, and into rotameter 32 where its rate of flow is measured. The metered acid mixture then flows through line 34 and is introduced into the top of the column through opening 36. The aliphatic carboxylic acid and hydrogen peroxide react to form a percarboxylic acid which then flows downwardly in the column, in aqueous droplets.

After the ethylenic compound passes through the water layer, at the base of the column, it flows upward and is contacted by a number of discontinuous aqueous droplets flowing countercurrently to it and containing hydrogen peroxide, carboxylic acid and the percarboxylic acid obtained by the reaction of these latter compounds. The ethylenic compound reacts with, and is epoxidized by, the percarboxylic acid, and carboxylic acid is given off in the reaction. The regenerated carboxylic acid then combines with additional hydrogen peroxide in an aqueous medium to form more percarboxylic acid. The free oxygen gas which is liberated by decomposition of the hydrogen peroxide passes through the packing 12 without forming gas pockets, and leaves the column through upper line 14.

A layer of aqueous solution is maintained in the base of the column, and excess aqueous solution is removed via line 16, through opening 50. The epoxidized product is removed from the top of the column through line 14.

The following examples are presented only as illustrations of the present process, and not intended as limitations on the scope thereof.

EXAMPLE I

A glass reaction column of the type shown in the drawing, having an inside diameter of 1.1 inches and packed with stainless steel Helipacks measuring 1.25 mm. by 2.54 mm. by 2.54 mm., was employed in this example. The column had a total length of 12.5 feet, and a capacity of about 2,400 cc. when filled with the Helipack packing. Butyl oleate was added to the base of the column at a rate of 33.2 cc. per minute. Its total residence time in the column was 1.25 hours. Hydrogen peroxide was added at the top of the column as a 50% by weight aqueous solution, and passed through the column at a rate of 5.3 cc. per minute. The aliphatic carboxylic acid employed was glacial acetic acid; it was mixed with a 96.4% sulfuric acid solution to yield a solution containing 3.2% by weight of sulfuric acid. This acid solution was added to the top of the column at a rate of 2.5 cc. per minute. During the reaction, the column was maintained at temperatures between 60° C. and 64° C., and at atmospheric pressure. The aqueous solution which collected in the base of the reactor was maintained between 1.8 to 2.0 feet above the base of the column. During the reaction, gas bubbles accumulated within the packing forming pockets of gas. These gas pockets were tenaciously held by the packing and were not dislodged by the fluid flow in the column. The epoxidized product recovered from the top of the column was analyzed and the results obtained are given in Table I.

EXAMPLE II

A glass reactor similar to that used in Example I was employed, except that it was filled with 6 mm. Berl saddle packing. The column had a capacity of 2400 cc. when filled with the 6 mm. Berl saddles. Butyl oleate was added to the base of the column at a rate of 33.3 cc. per minute. Its residence time in the column was 1.25 hours. Hydrogen peroxide was added to the top of the column as a 50% by weight aqueous solution. The flow rate of the hydrogen peroxide was regulated at 5.3 cc. per minute. The aliphatic carboxylic acid employed was glacial acetic acid; it was mixed with 96.4% sulfuric acid solution to give a solution containing 3.2% by weight of sulfuric acid. This acid solution was added to the top of the column at a rate of 2.5 cc. per minute. The column was maintained at temperatures between 59° and 65° C., and at atmospheric pressure. The aqueous solution which collected in the base of the reactor was maintained between 1.8 to 2.0 feet above the base of the column. It was observed that bubbles of gas were readily dispersed in the column, and no gas pockets formed within the packing. The epoxidized product recovered from the top of the column was analyzed and the results obtained are given in Table I.

EXAMPLE III

A glass reaction column was constructed of the type shown in the drawing. It had an inside diameter of 2.0 inches and was packed with 6 mm. Berl saddles. The column had a total length of 27 feet and had a capacity of 19,500 cc. when filled with the Berl saddles. An ethylenic feed comprising soybean oil and a diluent material, heptane, the heptane being present in amounts to form a solution containing 25% by volume of heptane, was added to the base of the column at a rate of 120 cc. per minute. Its residence time in the column was 2.5 hours. Hydrogen peroxide was added to the top of the column as a 50% by weight aqueous solution. The flow rate of the hydrogen peroxide was regulated at 25.9 cc. per minute. The aliphatic carboxylic acid employed was glacial acetic acid; it was mixed with 96.4% sulfuric acid to yield a sulfuric acid solution containing 6.5% of sulfuric acid by weight. This acid solution was added to the top of the column at a rate of 17.0 cc. per minute. The column was maintained at a temperature between 59° and 65° C., and at atmospheric pressure. The aqueous solution which collected in the base of the reactor was maintained at about 2 feet above the base of the column. The epoxidized product recovered was analyzed and the results obtained are given in Table I.

*Table I*

| Examples | 1[1] | 2[1] | 3[2] |
|---|---|---|---|
| Average Temp. °C | 62.0 | 62.0 | 65.0 |
| Molar Ratios: | | | |
| (1) Double Bond | 1.00 | 1.00 | 1.00 |
| (2) Carboxylic Acid | 0.50 | 0.50 | 0.70 |
| (3) $H_2O_2$ | 1.10 | 1.10 | 1.10 |
| (4) Percent Epoxy Conversion | 2.0 | 26.5 | 81.0 |
| (5) Percent Ring Opening | 1.7 | 3.9 | 12.5 |
| (6) Percent Unreacted Double Bond | 96.3 | 69.6 | 6.5 |
| (7) Moles of Active Oxygen Recovered per Mole of C—C | 0.92 | 0.44 | 0.10 |
| (8) Moles of Active Oxygen Decomposed per Mole of C—C | 0.14 | 0.36 | 0.07 |

[1] Column 12.5 feet long.
[2] Column 27 feet long.

As shown in Table I, the epoxidation reaction of Example I which was carried out in a column employing packing having its largest cross-sectional dimension smaller than about 4 mm., yielded only 2% of epoxidation. The same reaction was carried out in Example 2 in identical equipment and under identical conditions except that packing having a cross section of 6 mm. was employed. A twelve-fold improvement over the epoxy yield of Example I was thereby obtained. Further, when the length of the column was increased, see Example III, epoxidation yields were obtained in 2.5 hours which normally take from 7 to 11 hours in batch type operations of the type conventionally employed in the prior art. It will therefore be seen that the present process operates efficiently, with the rapid formation of epoxy products.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

We claim:

1. In the process of epoxidizing a compound containing an epoxidizable ethylenic group selected from the class consisting of ethylenically unsaturated acids, esters, alcohols, dodecene, and butadiene polymers and copolymers by the reaction of said compound with in situ-produced carboxylic peracid, the improvement which comprises introducing said compound into one end of an elongated reaction zone, introducing aqueous hydrogen peroxide and a saturated aliphatic carboxylic acid having from 1 to 8 carbon atoms into the opposite end of the reaction zone, passing said compound in intimate, continuous, countercurrent contact with an aqueous phase containing as essential ingredients said carboxylic acid, said hydrogen peroxide, and carboxylic peracid produced by in situ reaction of said hydrogen peroxide and said carboxylic acid in said reaction zone while dispersing gases present in the reaction zone, removing epoxidized product from one end of said reaction zone, and removing an aqueous solution from the other end of said reaction zone.

2. Process of claim 1, in which the saturated aliphatic carboxylic acid is present in the amount of about 0.25 to about 1 mole per mole of ethylenic unsaturation to be epoxidized.

3. Process of claim 2, in which the temperature of the reaction zone is maintained between 30° to 100° C.

4. Process of claim 3 wherein the saturated aliphatic carboxylic acid has from 1 to 3 carbon atoms.

5. In the process of epoxidizing higher unsaturated fatty ester, said ester containing as the alcohol moiety a straight chained, aliphatic, residue containing 1 to about 18 carbon atoms by the reaction of said compound with in situ produced carboxylic peracid, the improvement which comprises introducing said compound into one end of an elongated reaction zone, introducing aqueous hydrogen peroxide containing 45 to 55% by weight of hydrogen peroxide, a saturated aliphatic carboxylic acid having from 1 to 3 carbon atoms, and a catalytic amount of sulfuric acid into the opposite end of said reaction zone, said hydrogen peroxide being present in the amount of from 1.0 to 1.2 moles per mole of ethylenic unsaturation in said compound to be epoxidized and said saturated aliphatic carboxylic acid being present in the amount of from about 0.25 to about 1 mole per mole of ethylenic unsaturation in said compound to be epoxidized, passing said compound in intimate, continuous, countercurrent contact with an aqueous phase containing as essential ingredients said carboxylic acid, said hydrogen peroxide, said sulfuric acid, and the carboxylic peracid produced by the in situ reaction of said hydrogen peroxide and said carboxylic acid in said reaction one while dispersing gases present in the reaction zone, maintaining the temperature of said reaction zone between 50° and 90° C., removing epoxidized product from one end of said reaction zone, and removing an aqueous solution from the other end of said reaction zone.

6. Process of claim 5 wherein the saturated aliphatic carboxylic acid is acetic acid.

7. Process of claim 5 wherein the saturated aliphatic carboxylic acid is formic acid.

8. Process of claim 5 wherein the method of dispersing gas present in the reaction zone comprises employing in the reaction zone, a packing whose largest cross-sectional dimension is no smaller than about 4 mm.

References Cited in the file of this patent

UNITED STATES PATENTS 2,873,283   Yang _____ Feb. 10, 1959